United States Patent
Jousse et al.

(10) Patent No.: US 10,179,560 B2
(45) Date of Patent: Jan. 15, 2019

(54) METHOD AND DEVICE FOR DISCONNECTING AT LEAST ONE IGNITION OUTPUT STAGE FOR A SQUIB OF A PYROTECHNIC PROTECTION MEANS FOR A VEHICLE

(71) Applicant: Robert Bosch GmbH, Stuttgart (DE)

(72) Inventors: Alain Jousse, Stuttgart (DE); Hartmut Schumacher, Freiberg (DE); Ruediger Karner, Kornwestheim (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 193 days.

(21) Appl. No.: 15/301,993

(22) PCT Filed: Mar. 26, 2015

(86) PCT No.: PCT/EP2015/056568
§ 371 (c)(1),
(2) Date: Oct. 5, 2016

(87) PCT Pub. No.: WO2015/158519
PCT Pub. Date: Oct. 22, 2015

(65) Prior Publication Data
US 2017/0106825 A1    Apr. 20, 2017

(30) Foreign Application Priority Data

Apr. 16, 2014 (DE) .................. 10 2014 207 302

(51) Int. Cl.
*B60R 21/017* (2006.01)
*B60R 21/264* (2006.01)
*B60R 21/01* (2006.01)

(52) U.S. Cl.
CPC .......... *B60R 21/017* (2013.01); *B60R 21/264* (2013.01); *B60R 2021/01286* (2013.01)

(58) Field of Classification Search
None
See application file for complete search history.

(56) References Cited

U.S. PATENT DOCUMENTS 6,052,634 A * 4/2000 Pathe ................ B60K 28/14
                                                        180/274
8,229,630 B2   7/2012 Klug et al.
(Continued)

FOREIGN PATENT DOCUMENTS

DE        603 06 111 T2     1/2007
DE   10 2008 044 405 A1     8/2009
(Continued)

OTHER PUBLICATIONS

International Search Report issued in PCT/EP2015/056568 dated Jun. 24, 2015.

*Primary Examiner* — Todd M Melton
*Assistant Examiner* — Jason R Roberson
(74) *Attorney, Agent, or Firm* — Norton Rose Fulbright US LLP; Gerard Messina

(57) ABSTRACT

A method for disconnecting at least one ignition output stage for a squib of a pyrotechnic protection device for a vehicle. The method includes a step of setting an activation signal at an activation level when an amperage of the trigger current for the ignition output stage exceeds a predefined current threshold value, a step of determining a period of time during which the activation signal is set at the activation level, and also a step of supplying a switch signal for disconnecting the ignition output stage, as a function of a comparison of the period of time with a predefined minimum current flow duration.

10 Claims, 3 Drawing Sheets

(56) References Cited

U.S. PATENT DOCUMENTS

| | | | |
|---|---|---|---|
| 2010/0250070 A1* | 9/2010 | Soriano Vilalta | B60R 22/321 |
| | | | 701/45 |
| 2014/0188347 A1* | 7/2014 | Tabe | B60R 21/01516 |
| | | | 701/45 |
| 2017/0106825 A1 | 4/2017 | Jousse et al. | |

FOREIGN PATENT DOCUMENTS

| | | | |
|---|---|---|---|
| JP | 2009067289 A | 4/2009 | |
| WO | WO-03062021 A1 * | 7/2003 | B60R 21/017 |

* cited by examiner

METHOD AND DEVICE FOR DISCONNECTING AT LEAST ONE IGNITION OUTPUT STAGE FOR A SQUIB OF A PYROTECHNIC PROTECTION MEANS FOR A VEHICLE

BACKGROUND INFORMATION

The present invention relates to a method for disconnecting at least one ignition output stage for a squib of a pyrotechnic protection device for a vehicle, a corresponding device for disconnecting at least one ignition output stage for a squib of a pyrotechnic protection device for a vehicle, an ignition output stage device including a corresponding device as well as a corresponding computer program product.

For activation of squibs in pyrotechnic restraint systems, a minimum current flow over a certain period of time is required by the manufacturer of the ignition devices to ensure a safe and accurately timed ignition. To meet these demands, the design of the circuit is designed in such a way that it meets requirements, while taking into account all tolerances. As a result, both the period of time and the current are selected to be substantially higher than required. The power output stages, for example, which make it possible to feed current to the ignition devices, are designed therefore to be substantially larger than would correspond to the demands.

SUMMARY

A method is provided for disconnecting at least one ignition output stage for a squib of a pyrotechnic protection device for a vehicle, also a device for disconnecting at least one ignition output stage for a squib of a pyrotechnic protection device for a vehicle, the device using this method, an ignition output stage device including a device for disconnecting an ignition output stage for a squib of a pyrotechnic protection device for a vehicle, and finally, a corresponding computer program product are described. Advantageous embodiments are derived from the description herein.

Electrical and electronic components are subject to tolerances. An ignition output stage for a squib may advantageously be designed to be smaller if a minimal current flow or a current flow of a minimum size is achieved over a certain period of time even without overdimensioning the components and/or a circuit for triggering the squib and despite the tolerances of the components used. It is thus possible to monitor the required minimum current flow and the predetermined period of time and thereby indirectly prevent overloading of individual components.

A method is presented for disconnecting at least one ignition output stage for a squib for a pyrotechnic protection device for a vehicle, the method including the following steps:

Setting an activation signal for an activation level when the amperage of a triggering current for the ignition output stage exceeds a predefined current threshold value;

Determining a period of time during which the activation signal is set at the activation level; and Supplying a switch signal for disconnecting the ignition output stage, as a function of a comparison of the period of time with a predefined minimum current flow duration.

A pyrotechnic protection device for a vehicle may be understood to be a restraint device such as an airbag or a seat belt. An ignition output stage may be understood to be a power output stage including at least one transistor. An ignition output stage may be provided for triggering the pyrotechnic protection device. The activation signal may provide two signal levels. The predefined current threshold value may represent a minimum current flow defined by the squib. The minimum current flow may represent a minimum requirement for an amperage, which is necessary for deployment or for correct triggering of the squib. The predefined minimum duration of current flow may represent a minimum requirement for a period of time for correct triggering of the squib. The ignition output stage may be disconnected advantageously by the method presented here, as soon as the required minimum current has been supplied by the ignition output stage for a required duration of the minimum current flow for triggering the squib. An optimal design of the output stage may be achieved or implemented advantageously, and cost savings may be achieved thereby.

Furthermore, in the step of determining, the period of time may be determined using a counter. A counter content of the counter may represent the period of time. The counter may increment the counter content in response to the activation signal. In the step of determining, the period of time may be determined by using a timer. The timer may be designed to implement the counter in a predefined interval of time in response to the activation signal. The period of time in which the amperage of the trigger current is greater than the current threshold value may also be determined advantageously by this specific embodiment.

In the step of supplying, the period of time and additionally or alternatively the counter content may be compared with a predefined threshold value. The threshold value may represent the minimum current flow duration. For triggering the squib, a minimum current flow duration may be defined. The counter content may be compared with a threshold value to determine the minimum current flow duration. It is thus possible to easily and inexpensively monitor whether the minimum current flow duration is maintained.

In the step of setting, the amperage may be determined using a current transformer. The amperage of the trigger current may be detected or determined using a current transformer and/or ammeter. The amperage may advantageously be determined without any change in the trigger current.

Furthermore, in the step of setting, the amperage may be compared with a threshold current representing the current threshold value by using a comparator. To determine that the trigger current has a required minimum current or at least the current threshold value for triggering the squib, the amperage may be compared inexpensively to the current threshold value by using a comparator.

Optionally the amperage may be detected in a step of detecting preceding the step of setting. The amperage in particular may be detected using a current transformer. The amperage may thus be detected by using a current transformer in the step of detecting.

The method may include a step of triggering an ignition output stage in response to the switch signal. The ignition output stage may include at least one transistor, in particular a MOSFET transistor. In the step of triggering, the ignition output stage may be triggered in response to the switch signal. The ignition output stage may include a switch. In one specific embodiment, the ignition output stage may have a high-side switch and a low-side switch for controlling the trigger current.

A device for disconnecting at least one ignition output stage for a squib of a pyrotechnic protection device for a vehicle is provided, the device including the following features:

a setting device for setting an activation signal at an activation level when an amperage of a trigger current exceeds a predefined current threshold value for the ignition output stage;

a determination device for determining a period of time during which the activation signal is set at the activation level; and an interface for supplying a switch signal for disconnecting the ignition output stage, as a function of a comparison of the period of time with a predefined minimum current flow duration.

In accordance with the present invention, a device is provided for disconnecting at least one ignition output stage for a squib of a pyrotechnic protection device for a vehicle, the device being designed to carry out or implement the steps of a variant of a method presented here in corresponding equipment. Through this embodiment variant of the present invention in the form of a device, the object on which the present invention is based may be achieved quickly and efficiently.

A device in the present case may be understood to be an electrical device, which processes sensor signals and outputs control signals and/or data signals as a function thereof. The device may have an interface, which may be provided in hardware and/or software. In a hardware design, the interfaces may be part of a so-called system ASIC, for example, which includes a wide variety of functions of the device. However, it is also possible for the interfaces to be separate integrated circuits or to at least partially include discrete elements. In a software design, the interfaces may be software modules, which are present on a microcontroller, for example, in addition to other software modules.

It is also favorable if the setting device includes a current transformer and a comparator. Furthermore, the determination device may include a counter and a timer. The interface to the supplying step may include a comparator. The current transformer may be designed to detect the trigger current and to supply an amperage signal representing the trigger current. The comparator may be designed to set the activation signal at the activation level when the amperage signal exceeds a current threshold value signal. A counter content of the counter may be incremented in response to the activation signal and a signal of the timer. Furthermore, the comparator may be designed to supply the switch signal when the counter content exceeds the threshold value.

In accordance with the present invention, an ignition output stage device is provided including an ignition output stage and a variant of a device presented here for disconnecting at least one ignition output stage for a squib of a pyrotechnic protection device for a vehicle. The ignition output stage includes a high-side switch and a low-side switch for controlling a trigger current and also includes an interface for supplying the trigger current to the squib for the pyrotechnic protection device. The interface of the device is designed to supply the switch signal as a control signal for at least one of the switches.

A computer program product or a computer program having program code, which may be stored on a machine-readable carrier or a memory medium, such as a semiconductor memory, a hard drive memory or an optical memory and is used for carrying out, implementing and/or triggering the steps of the method according to one of the specific embodiments described above, in particular when the program product or program is carried out on a computer or a device.

The present invention is explained below in greater detail on the basis of the figures by way of example.

DETAILED DESCRIPTION OF EXAMPLE EMBODIMENTS

Figure 1:
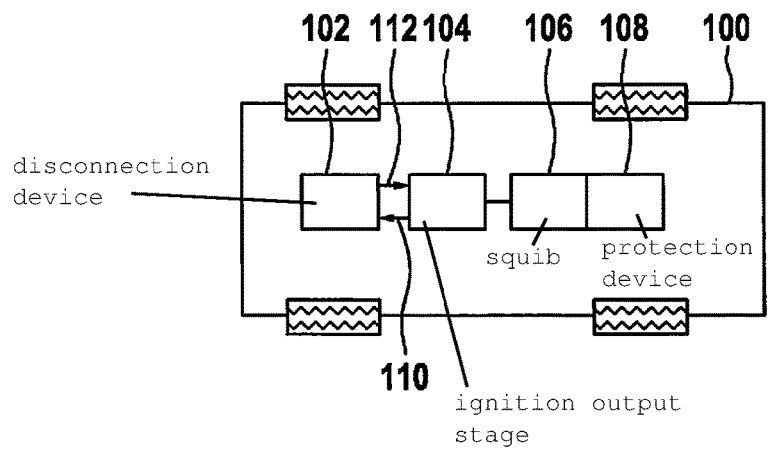
FIG. 1 shows a vehicle including a device for disconnecting at least one ignition output stage according to one exemplary embodiment of the present invention.

In the following description of favorable exemplary embodiments of the present invention, the same or similar reference numerals are used for the elements having similar effects and shown in the various figures, a repeated description of these elements being omitted.

FIG. 1 shows a vehicle 100 including a device 102 for disconnecting at least one ignition output stage 104 for a squib 106 of a pyrotechnic protection device 108 according to one exemplary embodiment of the present invention. Vehicle 100 includes protection device 108. Depending on the exemplary embodiment, protection device 108 is a restraint device such as an airbag or a seat belt tensioner or some other pyrotechnically triggerable protection device 108, which is triggered via squib 106. Squib 106 is ignited by a corresponding trigger current 110. Certain minimum requirements are in effect for the trigger current, such as a minimum amperage and a minimum current flow duration, which are to be met for ignition of squib 106.

Device 102 is designed to monitor trigger current 110 and supply a switch signal 112 to disconnect ignition output stage 104 when the minimum demands of the trigger current for igniting squib 106 are met.

One aspect of the present exemplary embodiment is disconnection of ignition output stages 104 in airbag control units as a function of the current flow duration through squib 106. An ignition output stage 104 including independent disconnection 102 is presented in the exemplary embodiment shown in FIG. 1.

Figure 2:
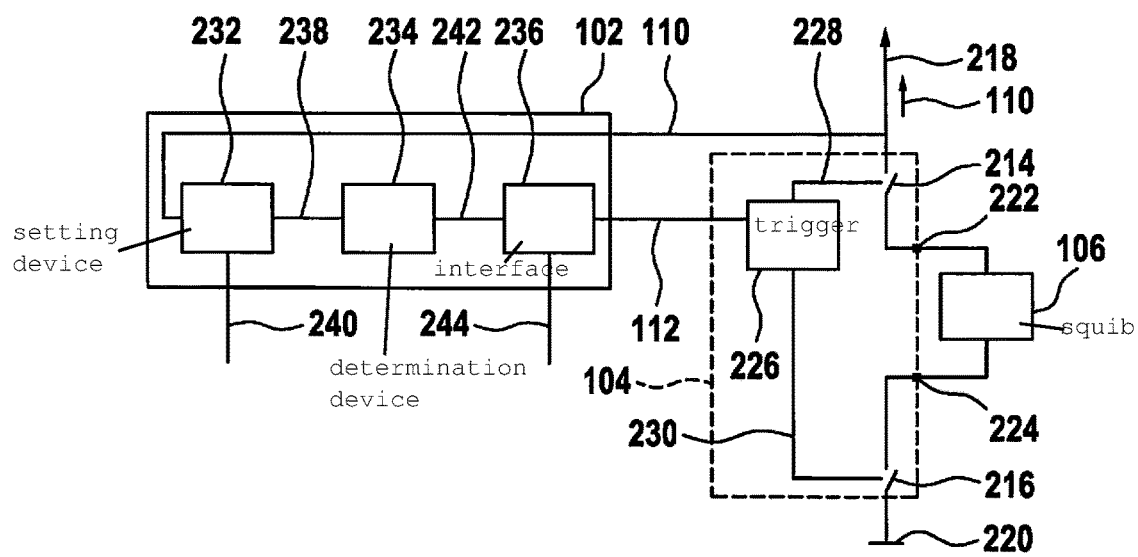
FIG. 2 shows a block diagram of a device for disconnecting at least one ignition output stage for a squib of a pyrotechnic protection device for a vehicle according to an exemplary embodiment of the present invention.

FIG. 2 shows a block diagram of a device 102 for disconnecting at least one ignition output stage for a squib of a pyrotechnic protection device for a vehicle according to one exemplary embodiment of the present invention. The vehicle may be, for example, an exemplary embodiment of a vehicle 100 shown in FIG. 1. The ignition output stage and the squib may thus be exemplary embodiments of ignition output stage 104 and squib 106 shown in FIG. 1.

According to this exemplary embodiment, ignition output stage 104 includes a first switch 214, a second switch 216 and two terminals 222, 224 for connecting squib 106. Two switches 214, 216 are connected between a first potential terminal 218, for example, a voltage source, and a second potential terminal 220, for example, a ground terminal, in a series connection. When switches 214, 216 are closed, trigger current 110 may flow via switches 214, 216 as well as squib 106 connected to terminals 222, 224 and thereby effectuate ignition of squib 106.

In the exemplary embodiment shown here, ignition output stage 104 includes a trigger device 226 for activating both switches 214, 216 in response to switch signal 112. Trigger device 226 is designed to receive switch signal 112 and convert it into corresponding control signals 228, 230. Control signal 228 controls first switch 214, and control signal 230 controls second switch 216.

In one exemplary embodiment (not shown), ignition output stage 104 has only one switch, for example, first switch 214 or alternatively, second switch 216. In one exemplary embodiment, switch signal 112 is sent directly to switch 214, switch 216 or alternatively to both switches 214, 216. In this case, ignition output stage 104 does not include a trigger device 226.

Device 102 may also be an exemplary embodiment of a device 102 shown in FIG. 1 for disconnecting an ignition output stage 104 for a squib 106 of a pyrotechnic protection device for a vehicle. Device 102 includes a setting device 232, a determination device 234 and an interface 236. Setting device 232 is designed to set an activation signal 238 at an activation level when an amperage of trigger current 110 for the ignition output stage exceeds a predefined current threshold value 240. In one exemplary embodiment, setting device 232 includes a current measuring mechanism, i.e., an ammeter (not shown here). A measuring shunt may therefore be inserted into the feeder line between first potential terminal 218 and ignition output stage 104, or a measurement coil may be inserted, for example. Determination device 234 is designed for determining a period of time 242, during which activation signal 238 is set at the activation level. Period of time 242 is determined by using activation signal 238. Interface 236 is designed to supply switch signal 112 for disconnecting ignition output stage 104. Switch signal 112 is supplied as a function of a comparison of the period of time 242 with a predefined minimum current flow duration 244.

The exemplary embodiment of a device 102 presented here allows an optimal design of ignition output stages 104 and therefore cost savings in the design of ignition output stages 104 and their triggering, due to the reliable fulfillment of the minimum requirement of the squib manufacturer. One aspect of the exemplary embodiment presented here is that the period of time during which the required minimum current flows is measured or determined, and on reaching the required minimum current duration, ignition output stages 104 are disconnected automatically. By minimizing the activation time of the output stages, the power loss through these modules is much lower. The module may therefore also be designed to be smaller in terms of surface area, which results in a cost reduction.

Figure 3:
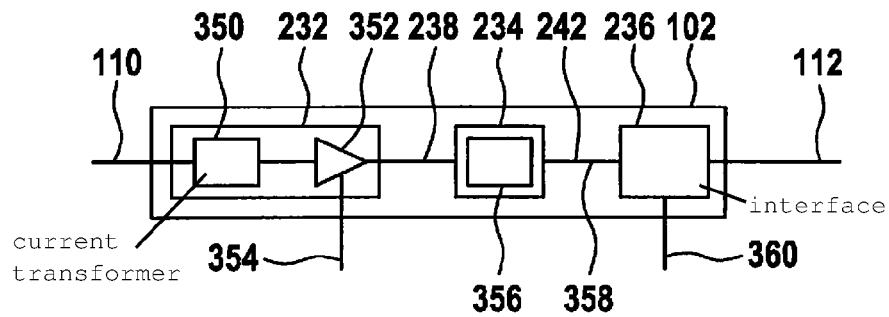
FIG. 3 shows a block diagram of a device for disconnecting at least one ignition output stage for a squib according to one exemplary embodiment of the present invention.

FIG. 3 shows a block diagram of a device 102 for disconnecting at least one ignition output stage for a squib of a pyrotechnic protection device for a vehicle according to an exemplary embodiment of the present invention. Device 102 may be an exemplary embodiment of a device 102 described in FIG. 1 or FIG. 2. Device 102 includes a setting device 232, a determination device 234 and an interface 236. Setting device 232 is designed to input or, alternatively, to detect a trigger current 110. Interface 236 is designed to disconnect the ignition output stage for the squib through a corresponding switch signal 112.

In the exemplary embodiment shown here, setting device 232 has a current transformer 350 and a comparator 352. Current transformer 350 is designed to determine the amperage of trigger current 110. In one exemplary embodiment, current transformer 350 is an ammeter 350 or some other suitable meter for detecting the amperage of trigger current 110. Comparator 352 is designed to compare the amperage detected by current transformer 350 with a threshold current 354 or a current threshold value signal 354 representing a current threshold value by using comparator 352.

Determination device 234 includes a counter 356, which is designed to determine the period of time during which activation signal 238 is set at the activation level. A counter content 358 of counter 356 represents a period of time 242.

In addition, interface 236 is designed to compare the period of time 242 or counter content 358 representing the period of time 242 with a predefined threshold value 360. Threshold value 360 represents a minimum current flow duration until ignition of the squib. Interface 236 is designed to supply switch signal 112 when period of time 242 has at least the value of the minimum current flow duration.

Figure 4:
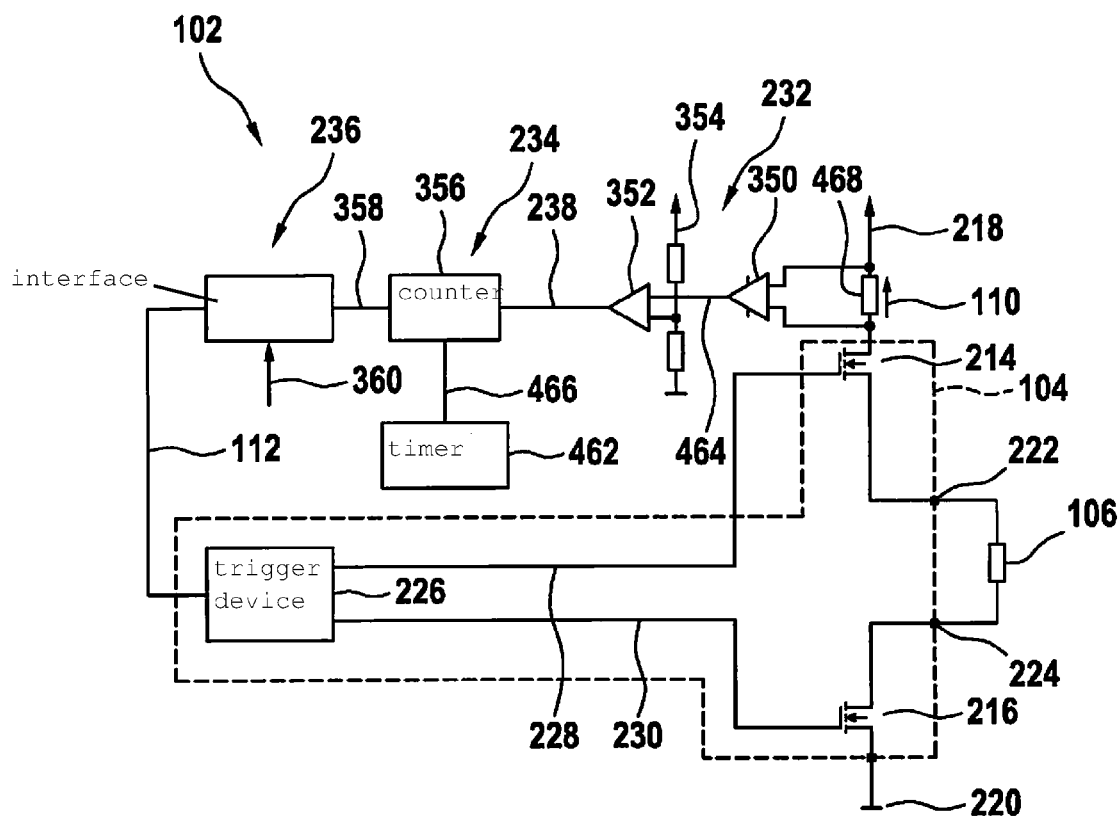
FIG. 4 shows a wiring diagram of an ignition output stage device including an ignition output stage for a squib and including a device for disconnecting the ignition output stage according to one exemplary embodiment of the present invention.

In one exemplary embodiment (not shown), device 102 includes a trigger device for triggering at least one ignition output stage in response to switch signal 112. FIG. 4 shows a variant of the trigger device labeled with reference numeral 226.

In one exemplary embodiment, the ignition output stage includes at least one MOSFET transistor, in particular a MOSFET transistor for switching trigger current 110 on and off.

FIG. 4 shows a wiring diagram of an ignition output stage device including an ignition output stage 104 for a squib 106 and including a device 102 for disconnecting ignition output stage 104 according to one exemplary embodiment of the present invention.

Device 102 may be an exemplary embodiment of a device 102 described in FIGS. 1 through 3. Device 102 includes a setting device 232, a determination device 234 and an interface 236. Setting device 232 has a current transformer 350 and a comparator 352. Determination device 234 has a counter 356 and a timer 462. Interface 236 has a comparator. Current transformer 350 is designed to detect trigger current 110 and to supply it as an amperage signal 464 representing the trigger current to comparator 352. Comparator 352 is designed to compare amperage signal 464 with a current threshold value signal 354 or threshold current 354 and to set activation signal 238 at the activation level when amperage signal 464 exceeds current threshold value signal 354.

A counter content 358 of counter 356 is incremented in response to activation signal 238 and a signal 466 of timer 462. The comparator of interface 236 is designed to supply switch signal 112 when counter content 358 exceeds threshold value 360.

A trigger current 110 is introducible or measurable at a terminal of device 102. The terminal of device 102 according to this exemplary embodiment is coupled to a line for conducting trigger current 110 through ignition output stage 104 via a measuring shunt 468 of current transformer 350 or ammeter 350. Measuring shunt 468 is situated in a suitable position within the line for conducting trigger current 110. In one exemplary embodiment (not shown), the terminal of device 102 is coupled via a measuring coil of ammeter 350 to the line for conducting trigger current 110 through ignition output stage 104. The measuring coil is situated in a suitable position within the line for conducting trigger current 110.

Terminal 218 is also referred to as "high out" while terminal 220 is also referred to as "low out."

First switch 214 is also referred to as a high-side switch or T1. Second switch 216 is also referred to as a low-side switch or T2. In one exemplary embodiment, the two switches 214, 216 are designed as transistors, in particular as MOSFET transistors, for example, as an N-channel MOSFET. For example, first switch 214 is situated between terminal 218, also referred to as "high out" and the terminal of device 102 for detecting trigger current 110. Second switch 216 is situated between terminal 220, also referred to as "low out," and a ground terminal.

Ignition output stage 104 in the exemplary embodiment shown in FIG. 4 has a terminal for control signal 112. A line for control signal 110 is connected to a trigger device 226. The trigger device supplies control signals 228, 230 at two outputs, and these signals are conveyed over corresponding lines to corresponding switches 214, 216.

One output of current transformer 350 to which amperage signal 464 is applied is connected to an input of comparator 352. Another input of comparator 352 is connected via a first comparator resistor to a terminal for current threshold value signal 354 and via a second comparator resistor to ground. Activation signal 238 is applied to the output of comparator 352. The output of comparator 352 is connected to an input of counter 356. A pulse generator 462 supplies a signal 466. Counter 356 is designed to increment a counter content 358 using signal 466 of pulse generator 462 and activation signal 238. Counter 356 is connected to interface 236. Interface 236 is designed to supply switch signal 112, switch signal 112 being output when counter content 358 reaches or alternatively exceeds threshold value 360. Interface 236 is connected to trigger device 226. Trigger device 226 is designed to trigger ignition output stage 104 in response to switch signal 112. Trigger device 226 is connected to first switch 214 via a terminal of ignition output stage 104 and additionally or alternatively to second switch 216.

Current 110, which flows to ground via first switch 214 (transistor 1; T1), squib 106 and second switch 216 (transistor 2; T2) is measured using device 102, and the value of this trigger current 110 is conveyed to comparator 352. The threshold of comparator 352 is established as a function of the required ignition current level. As long as measured current 110 indicated by amperage signal 464 is above the required threshold 354, a timer 462 is activated, incrementing a counter 356 in an established time interval. If this counter 356 has reached a counter content 358, which corresponds to the required activation time, then switches 214, 216 or output stages T1 and T2 are both disconnected.

Figure 5:
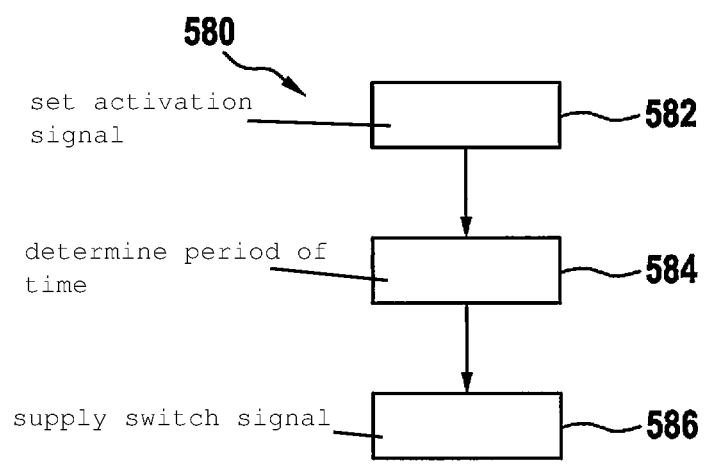
FIG. 5 shows a flow chart of a method for disconnecting at least one ignition output stage for a squib of a pyrotechnic protection device for a vehicle according to one exemplary embodiment of the present invention.

FIG. 5 shows a flow chart of a method 580 for disconnecting at least one ignition output stage for a squib of a pyrotechnic protection device for a vehicle according to an exemplary embodiment of the present invention. The ignition output stage may be an ignition output stage 104 as shown in FIG. 1 or FIG. 4. Method 580 includes a step 582 of setting an activation signal, a step 584 of determining a period of time and a step 586 of supplying a switch signal for disconnection of the ignition output stage. In step 582 of setting the activation signal, the activation signal is set at an activation level when the amperage of a trigger current for the ignition output stage exceeds a predefined current threshold value. In step 584 of determining a period of time, the period of time in which the activation signal is set at the activation level is determined. In step 586 of supplying, a switch signal for disconnecting the ignition output stage is supplied as a function of a comparison of the period of time with a predefined minimum current flow duration. In one exemplary embodiment, the switch signal is supplied when the period of time reaches at least the value of the predefined minimum current flow duration.

In one exemplary embodiment, the method includes an optional step (not shown here) of triggering at least one ignition output stage and, additionally or alternatively, another ignition output stage in response to the switch signal.

The exemplary embodiments described here and illustrated in the figures are selected only as examples. Different exemplary embodiments may be combined entirely with one another or with respect to individual features. One exemplary embodiment may also be supplemented by features of another exemplary embodiment.

Furthermore, the method steps presented here may be repeated in a different order than the one described here.

If an exemplary embodiment includes an "and/or" linkage between a first feature and a second feature, this is to be understood to mean that the exemplary embodiment according to one specific embodiment has both the first feature and the second feature and according to another specific embodiment has either only the first feature or only the second feature.

What is claimed is:

1. A method for disconnecting at least one ignition output stage for a squib for a pyrotechnic protection device for a vehicle, the method comprising:
    setting an activation signal at an activation level responsive to an amperage of a trigger current for the ignition output stage being at least as high as a predefined current threshold value;
    determining a period of time in which the activation signal is set at the activation level; and
    supplying a switch signal for disconnecting the ignition output stage in response to the period of time being at least as long as a predefined minimum current flow duration.

2. The method as recited in claim 1, wherein, in the step of determining, the period of time is determined using a counter, a counter content of the counter representing the period of time.

3. The method as recited in claim 2, wherein, in the step of supplying, at least one of the period of time and the counter content is compared with a predefined threshold value, the threshold value representing the minimum current flow duration.

4. The method as recited in claim 1, wherein, in the step of setting, the amperage is determined using a current transformer.

5. The method as recited in claim 1, wherein, in the step of setting, the amperage is compared with a threshold current representing the current threshold value using a comparator.

6. The method as recited claim 1, further comprising:
    triggering an ignition output stage in response to the switch signal.

7. A device for disconnecting at least one ignition output stage for a squib of a pyrotechnic protection device for a vehicle, the device comprising:
    a setting device for setting an activation signal at an activation level responsive to an amperage of a trigger current for the ignition output stage being at least as high as a predefined current threshold value;

a determination device for determining a period of time in which the activation signal is set at the activation level; and an interface for supplying a switch signal for disconnecting the ignition output stage in response to the period of time being at least as long as a predefined minimum current flow duration.

8. The device as recited in claim 7, wherein the setting device includes a current transformer and a comparator, the determination device includes a counter and a timer, and the interface includes a comparator, the current transformer being designed to detect the trigger current and to supply an amperage signal representing the trigger current, the comparator being designed to set the activation signal at the activation level when the amperage signal exceeds a current threshold value signal, a counter content of the counter being incremented in response to the activation signal and a signal of the timer, and the comparator being designed to supply the switch signal when the counter content exceeds the threshold value.

9. An ignition output stage device, comprising:
   an ignition output stage including a high-side switch and a low-side switch for controlling a trigger current, and an interface for supplying the trigger current to a squib for a pyrotechnic production device for a vehicle; and
   a device for disconnecting the ignition output stage, the device including:
      a setting device for setting an activation signal at an activation level responsive to an amperage of the trigger current for the ignition output stage being at least as high as a predefined current threshold value;
      a determination device for determining a period of time in which the activation signal is set at the activation level; and
      an interface for supplying a switch signal for disconnecting the ignition output stage in response to the period of time being at least as long as a predefined minimum current flow duration, the interface of the device being designed to supply the switch signal as a control signal for at least one switch.

10. A non-transitory machine-readable memory medium on which is stored a computer program for disconnecting at least one ignition output stage for a squib for a pyrotechnic protection device for a vehicle, the computer program, when executed by a processor, causing the processor to perform:
   setting an activation signal at an activation level responsive to an amperage of a trigger current for the ignition output stage being at least as high as a predefined current threshold value;
   determining a period of time in which the activation signal is set at the activation level; and
   supplying a switch signal for disconnecting the ignition output stage in response to the period of time being at least as long as a predefined minimum current flow duration.

* * * * *